United States Patent [19]

Takahashi et al.

[11] Patent Number: 4,792,944
[45] Date of Patent: Dec. 20, 1988

[54] TIME-DIVISION MULTIPLEXING COMMUNICATION SYSTEM FOR PERFORMING A PLURALITY OF COMMUNICATIONS HAVING DIFFERENT DATA SPEEDS

[75] Inventors: Yasuhiro Takahashi; Kunio Hiyama, both of Fujisawa, Japan

[73] Assignee: Hitachi, Ltd., Tokyo, Japan

[21] Appl. No.: 941,839

[22] Filed: Dec. 15, 1986

[30] Foreign Application Priority Data

Dec. 20, 1985 [JP] Japan ................................. 60-288191

[51] Int. Cl.[4] ............................................. H04J 3/02
[52] U.S. Cl. ........................................ 370/84; 370/86
[58] Field of Search ...................... 370/84, 85, 86, 89, 370/13; 340/825.05; 371/48, 53

[56] References Cited

U.S. PATENT DOCUMENTS

| | | | |
|---|---|---|---|
| 3,921,137 | 11/1975 | McClearn, Jr. et al. | 370/89 |
| 4,413,338 | 11/1983 | Renoulin et al. | 370/84 |
| 4,566,099 | 1/1986 | Magerl | 370/84 |

Primary Examiner—Douglas W. Olms
Attorney, Agent, or Firm—Antonelli, Terry & Wands

[57] ABSTRACT

A communication system in which a plurality of terminal devices connected to a loop transmission line perform data transmission/reception in a time-division multiplexing manner by using a communication frame circulating the transmission line. The communication frame being constituted by a plurality of sub-frames, each including a plurality of time slots. Each of the terminal devices is arranged to perform data transmission/reception using a designated time slot in a designated sub-frame. All the sub-frames in the communication frame are allotted to a terminal device of a high capability of data transmission, while less than all of the sub-frames are allotted to a terminal device of a low capability of data transmission. A plurality of low speed terminal devices, to which sub-frames different from each other have been respectively allotted, commonly use a time slot of the same number, so that each of the time slots in the communication frame can be effectively utilized.

2 Claims, 5 Drawing Sheets

FIG. 5

| FRAME MODE 1/N1 | FRAME NO. N2 | ASSIGNED SUB-FRAME NO.: Fn | TRANSMIT DATA CAPACITY (TERMINAL SPEED) |
|---|---|---|---|
| $\frac{1}{1}$ | ONE OF 0 ~ 7 | 0,1,2,3,4,5 6 AND 7 | 48 Kbps (~ 48 Kbps) |
| $\frac{1}{2}$ | 0,2,4 OR 6 | 0,2,4 AND 6 | 24 Kbps (~ 19.2 Kbps) |
| | 1,3,5 OR 7 | 1,3,5 AND 7 | |
| $\frac{1}{4}$ | 0 OR 4 | 0 AND 4 | 12 Kbps (~ 9.6 Kbps) |
| | 1 OR 5 | 1 AND 5 | |
| | 2 OR 6 | 2 AND 6 | |
| | 3 OR 7 | 3 AND 7 | |
| $\frac{1}{8}$ | 0 | 0 | 6 Kbps (~ 4.8 Kbps) |
| | 1 | 1 | |
| | 2 | 2 | |
| | 3 | 3 | |
| | 4 | 4 | |
| | 5 | 5 | |
| | 6 | 6 | |
| | 7 | 7 | |

TIME-DIVISION MULTIPLEXING COMMUNICATION SYSTEM FOR PERFORMING A PLURALITY OF COMMUNICATIONS HAVING DIFFERENT DATA SPEEDS

BACKGROUND OF THE INVENTION

1. Field of the Invention

The present invention generally relates to a time-division multiplexing communication system, and particularly relates to a time-division multiplexing communication system in which high speed data terminals and low speed data terminals are allowed to exist together with each other and circuit channels can be efficiently allotted to the low speed data terminals.

2. Description of the Prior Art

The improvement in data transmitting efficiency is an important problem to be solved in a communication system which includes a plurality of communication nodes provided on a data transmission line so, that data communication is performed in a time-division multiplexing manner among terminal devices connected to the respective communication nodes. For example, Japanese Patent Unexamined Publication No. 21940/1983 (U.S. Ser. No. 402,118) discloses a time-division multiplexing communication system in which a communication frame transferred on a transmission line is divided into a plurality of time slots and each of the time slots is provided with a validity indication bit for indicating whether the data contained in the time slot concerned is valid or not. In this communication system, if the respective terminal device has data to be sent out and when the terminal device sends out the data into a time slot allotted to the terminal device concerned, the terminal device sets the validity indication bit of the time slot to "1". If the terminal device has no data to be sent out, on the contrary, the terminal device sets the validity indication bit to "0". In the thus arranged communication system, it is sufficient for a terminal device operating as a data receiver to take-in reception data in a time slot as a valid only when the validity indication bit of the time slot is "1", while invalidating the received data when the validity indication bit is "0". Accordingly, a plurality of terminal devices can perform communication by using the same transmission line independently of the data transmitting speed of the respective terminal device. In such a communication system, however, there is a problem that the utilization factor decreases when each of the communication nodes is capable of transmitting data at a high speed because a time slot allotted to a low speed terminal device is occupied for transmission of invalid data. Further the number of the terminal devices which can perform communication at the same time becomes small when the data transmitting capability among the communication nodes is low because a high speed terminal device requires a plurality of time slots to be alotted thereto.

As another conventional communication system, for example, the documents "FUJITSU" published by Fujitsu Ltd., Vol. 33, No. 2 (Pages 153–162) and Vol. 33 No. 3 (Pages 77–86) (1982) describes systems "FOPIC 7300" and "FOPIC 7300AD" in which each time slot is constituted by a train of data bits, a modem control signal, and a parity bit so as to perform inter-terminal communication without providing the validity indication bit. In those systems, there is such a problem that the data transmitting speed of each of the terminal devices should agree with the data transmitting speed among the communication nodes so that the terminal devices which can be connected to a network are limited, because those systems are arranged on the assumption that only valid data are sent by each time slot.

SUMMARY OF THE INVENTION

It is therefore an object of the present invention to provide a time-division multiplexing communication system in which a plurality of terminal devices, different in data transmission speed, can be connected to a data transmission line.

It is another object of the present invention to provide a time-division multiplexing communication system in which a plurality of relatively low speed terminal devices can be connected to a data transmission line without deteriorating the data transmitting efficiency on the data transmission line.

In order to attain the above objects, according to the present invention, a communication frame constituted by a plurality of sub-frames (N in number) is circulated at a predetermined period on a loop data transmission line including a plurality of communication nodes so that each of the communication nodes transmits data from a terminal device into a designated time slot in a designated sub-frame. One or more time slots in each of all the N sub-frames are allotted to a high speed terminal device. On the contrary, a time slot at a designated position in each of designated M ($1 \leq M < N$) sub-frames among the above-mentioned N sub-frames is allotted to a terminal device the speed of which is lower than the data transmitting speed among the communication nodes. In a communication node to which a low speed terminal device is connected, it takes time until data of a plurality of bits to be sent out next have been prepared after sending-out data to a sub-frame, so that the data to be sent out cannot be prepared at a point in time where the next sub-frame is transferred. Accordingly, if one or a plurality of ones selected at predetermined intervals among the N sub-frames are allotted to such a communication node, it is possible to transmit data from a low speed terminal device without any problem. According to the present invention, a time slot/slots to be used and a sub-frame/sub-frames to be used are designated to each of the communication nodes in accordance with the data transmitting capability of the respective terminal devices connected to the communication nodes. Thus, because the time slot of the same number is used in a multiplexing manner by a plurality of terminal devices, all the time slots in each of the communication frames on the loop transmission line can be effectively utilized and the number of circuits established in a time-division manner can be substantially increased.

The foregoing and other objects, advantages, manner of operation and novel features of the present invention will be understood from the following detailed description when read in connection with the accompanying drawings.

BRIEF DESCRIPTION OF THE DRAWINGS

FIG. 5 is a table for explaining the relation between the frame mode allotted to the communication node and the capacity of transmitting data.

DESCRIPTION OF THE PREFERRED EMBODIMENTS

Figure 1:
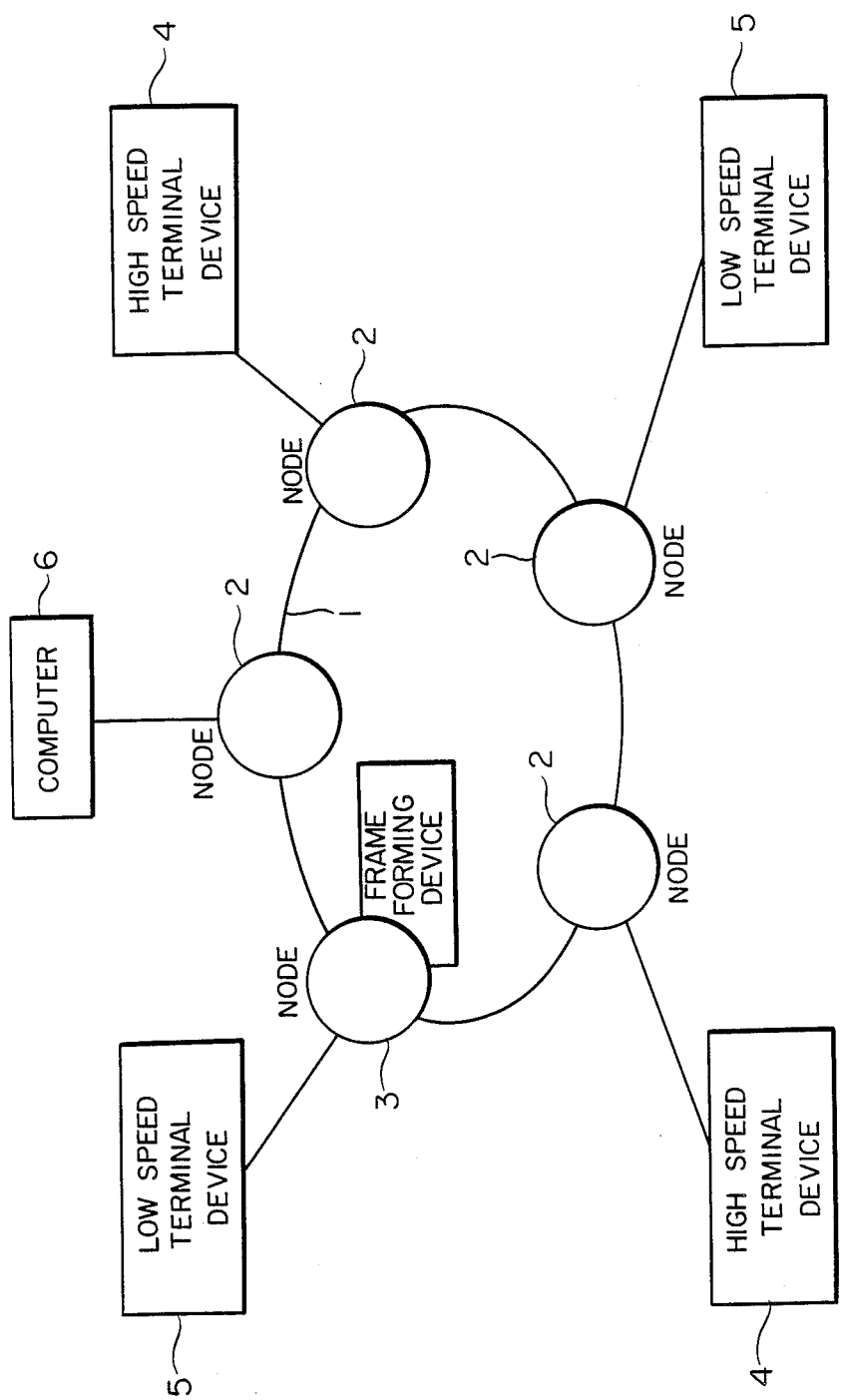
FIG. 1 is a diagram showing the whole arrangement of a loop transmission system to which the time-division multiplexing communication according to the present invention is applied.

FIG. 1 shows an arrangement of a loop transmission system to which the time-division multiplexing communication according to the present invention is applied. In the drawing, various equipment such as a high speed terminal device 4, a low speed terminal device 5, a computer 6, etc., are selectively connected to communication node devices 2 and 3. According to the invention, the high speed terminal device 4, the low speed terminal device 5, the computer 6, and the like, connected to the node devices are hereinafter referred to as terminal devices regardless of the kind and function thereof. Each of the node devices 2 is provided with a function for transmitting/receiving data to/from the high speed terminal device 4, the low speed terminal device 5, or the computer 6 connected thereto. The node device 3 is provided with a frame forming device 7 for forming a communication frame of such a format as shown in FIG. 2 in addition to the aforementioned function for transmitting/receiving data to/from the terminal device.

Figure 2:
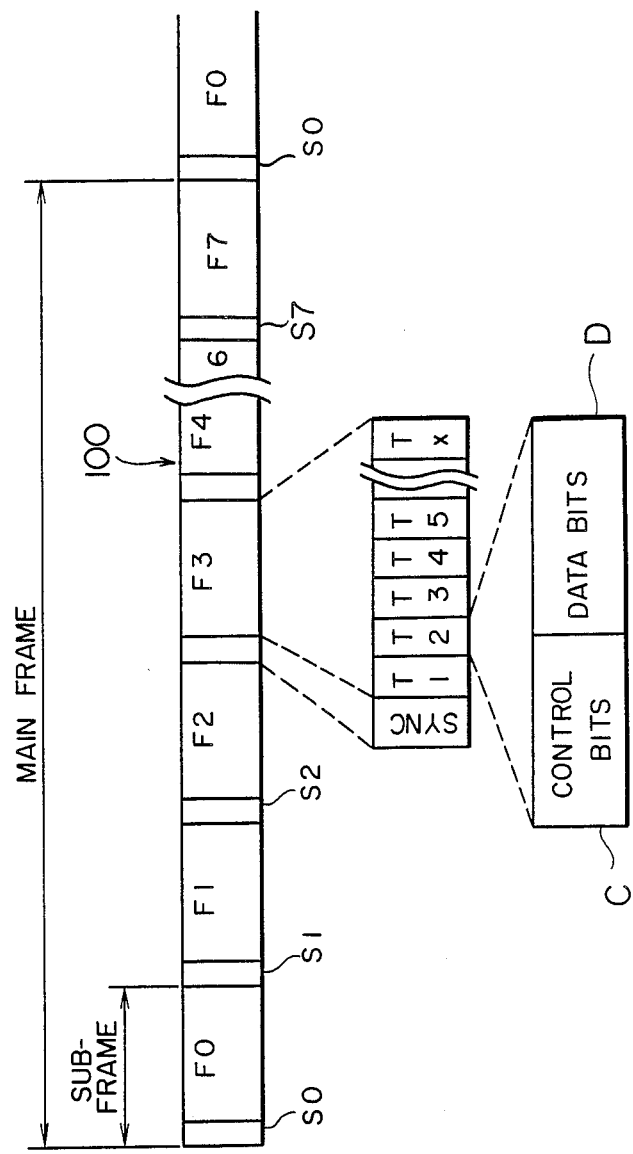
FIG. 2 is a diagram showing a format of a communication frame circulating a transmission line.

FIG. 2 is a diagram of a format of a communication frame circulating a loop transmission line 1. In this example, a main or super frame 100 periodically generated by the frame forming device 7 is constituted by N distinguishable sub-frames F0-F7 (N=8 in this case), and synchronizing patterns S0-S7 disposed at the head portion of each of the sub-frames. Each of the sub-frames is divided into X time slots $T_1$-$T_x$, and each of the time slots is constituted by, for example, a control bit field C of four bits and a data field D of six bits. One of the four bits of the control bit field C is used to store validity indication representing whether the data field D includes valid data or not as will be described later.

Each of the synchronizing patterns S0-S7 has a bit length, for example, corresponding to one or two time slots. A bit pattern indicating the head of the main frame is recorded in the synchronizing pattern S0, and bit patterns indicating the respective heads of the sub-frames are recorded in the synchronizing patterns S1-S7 of the respective sub-frames F0-F7. Assuming that the data transmitting capacity per time slot on the transmission line 1 is 48K bps (byte per second), the period of each of the sub-frames is 125 $\mu$sec, and the period of the main frame is 1 m sec.

Figure 3:
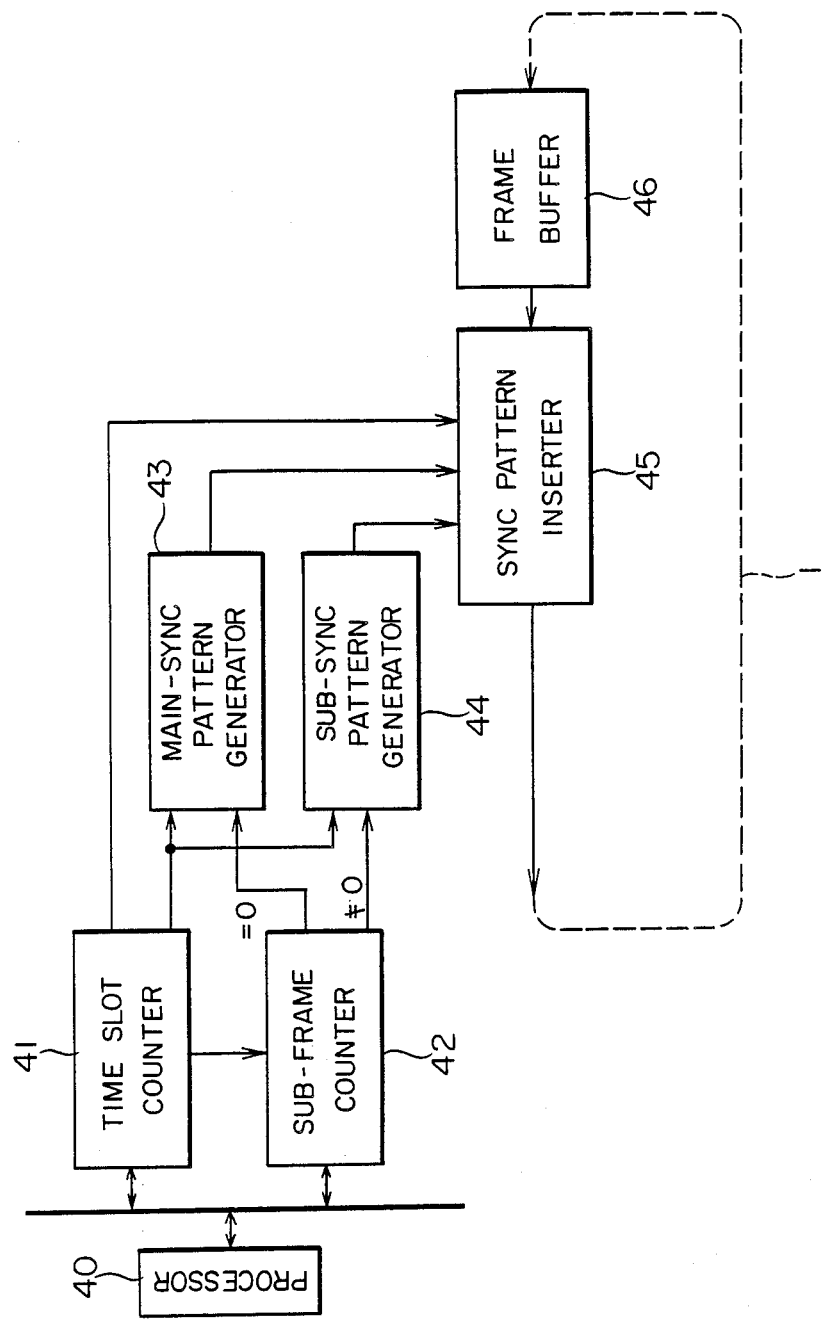
FIG. 3 is a block diagram showing an arrangement of means for forming the communication frame.

FIG. 3 shows an arrangement of the frame forming device for forming the main frame 100. In the node device 3, there is provided a processor 40 for performing control such as setting of an upper limit of counting with respect to counters 41 and 42. The counter 41 is arranged to count the number of the time slots in each sub-frame, from 0 to X for every 125 $\mu$sec which is the period of the sub-frame. The counter 42 is arranged to count the number of sub-frames in the main frame such that the counter 42 is incremented one by one for every sub-frame, that is, every time the counting of the time slot counter 41 circulates. Thus, the sub-frame counter 42 repeats the counting from 0 to 7.

When the sub-frame counter 42 indicates "0" and the time slot counter 41 indicates the number of time slot to which a synchronizing pattern is to be inserted, a main-synchronizing pattern is generated by a main-synchronizing pattern generator 43 and transferred to a synchronizing pattern inserter 45. On the contrary, when the sub-frame counter 42 indicates a numerical value other than "0" and the time slot counter 41 indicates the number of time slot to which a synchronizing pattern is to be inserted, a sub-synchronizing pattern is generated by a sub-synchronizing pattern generator 44 and transferred to the synchronizing pattern inserter 45.

On the basis of the count value transferred from the time slot counter 41, the synchronizing pattern inserter 45 transfers the main-synchronizing pattern or the sub-synchronizing pattern to the loop transmission line 1 in the synchronizing pattern region while transferring the data of the respective time slots received from a preceding phase adjusting frame buffer 46 into the loop transmission line 1 in the region other than the synchronizing pattern region, thereby forming the frame 100 on the loop transmission line 1. The phase adjusting frame buffer 46 is arranged to absorb a delay due to a loop length caused in the process in which the communication frame circulates the loop transmission line 1 and a delay caused in the communication node device for relaying data, so as to make the main frame circulate always at a predetermined period.

Thus, the frame shown in FIG. 2 is formed by the frame forming device 7. It is sufficient to provide the frame forming device 7 in only one of the node devices in the loop transmission line 1 (the node device 3 in this embodiment).

Figure 4:
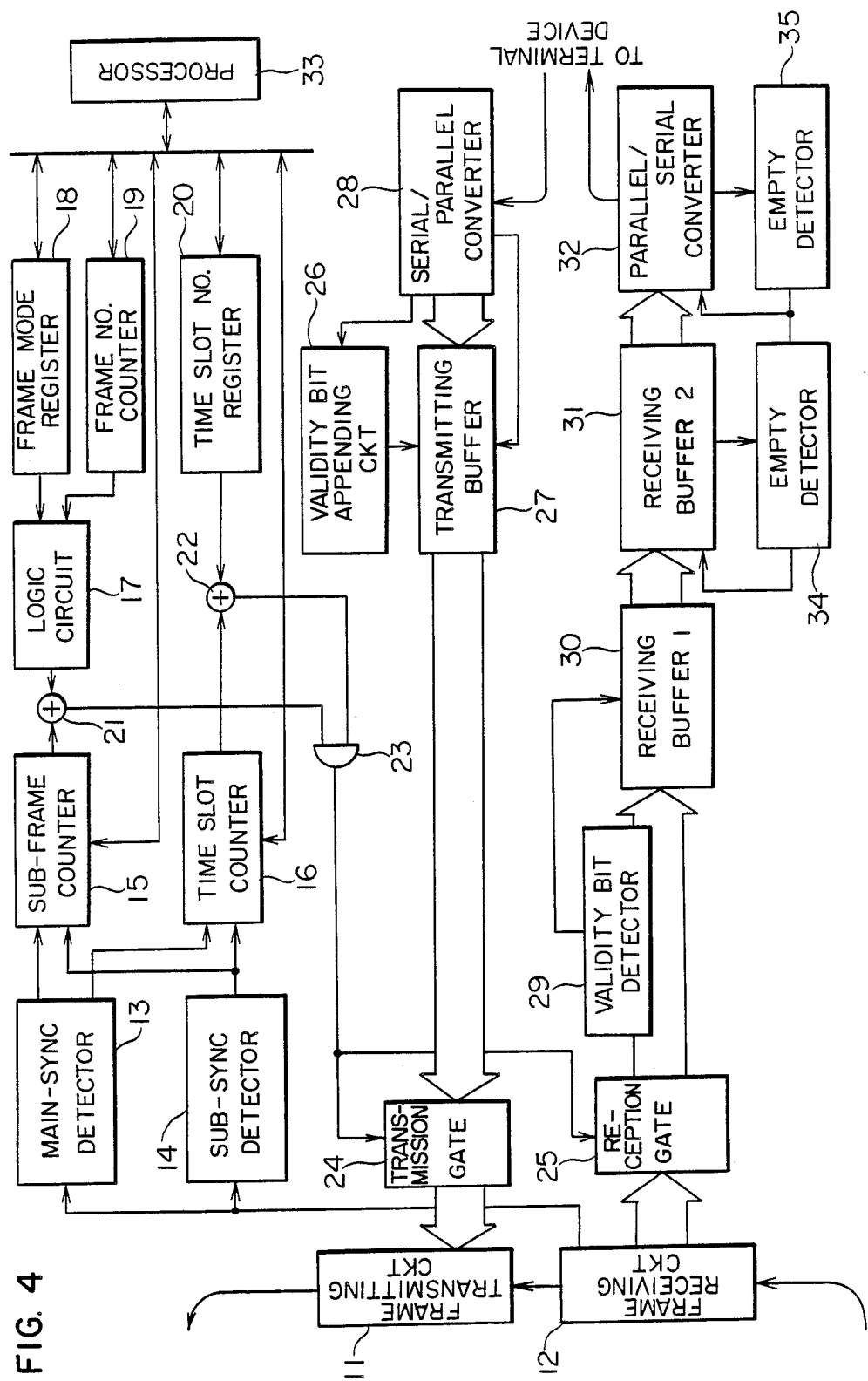
FIG. 4 is a block diagram showing an arrangement of a data transmitting unit provided in each of the communication nodes according to the present invention.

FIG. 4 shows an arrangement of the data transmitting unit constituting a main part of the respective node device for transmitting/receiving data to/from the terminal device 4, 5 or the computer 6 connected to the node device concerned. In FIG. 4, the data transmitting unit is provided with: a frame transmitting circuit 11 for transmitting data onto the loop transmission line 1 in accordance with the frame format; a frame receiving circuit 12 for receiving the communication frame on the loop transmission line 1; a main-synchronizing pattern detecting circuit 13 for detecting the main-synchronizing pattern S0 in the received frame; a sub-synchronizing pattern detecting circuit 14 for detecting the sub-synchronizing patterns S1-S7 in the received frame; a sub-frame counter 15 arranged to be incremented every time the synchronizing time slot of the respective sub-frame has been detected at the detecting circuit 13 or 14; a time slot counter 16 arranged to be reset every time the synchronizing time slots S0-S7 have been detected at the detecting circuit 13 or 14 and to be incremented at every predetermined timing corresponding to the period of the time slots; a frame mode register 18 for storing a numerical value showing at what rate a frame to be used is allotted, that is, the rate of how many frames to one at which a frame to be used is allotted to the node device concerned; a frame number register 19 for storing a number of a representative one of the sub-frames to be used in the node device concerned; a frame number determining logic circuit 17 for calculating a number of the frame allotted to the node device concerned for data transmission/reception on the basis of the numerical values (a first parameter) stored in the registers 18 and 19; and a time slot number register 20 for storing a number of the time slot (a second parameter) allotted to the node device concerned.

The data transmitting unit is further provided with: a comparator 21 for detecting coincidence between the count value of the sub-frame counter 15 and the output value of the frame number determining logic circuit 17; a comparator 22 for detecting coincidence between the count value of the time slot counter 16 and a value preset in the register 20; a transmitting gate 24; a receiving gate 25; and an AND gate 23 which is arranged to be opened when both the outputs of the respective comparators 21 and 22 become "1" to thereby open both the transmitting gate 24 and the receiving gate 25.

The data transmitting unit is further provided with: a transmitting buffer 27 for temporarily storing data to be transmitted; a serial-to-parallel converter 28 for receiving transmitting data serially transferred from the terminal device and for transferring the received data parallelly into the transmitting buffer 27; a circuit 26 for producing a validity indicating bit signal when six bits of data have been stored in the serial/parallel converter 28; a validity bit detector 29 for giving a latch signal to a first receiving buffer 30 upon detection of a validity indicating bit in the data of every time slot taken in the detector 29 through the receiving gate 25; a second receiving buffer 31 for absorbing disorder of the arriving period of the received data; a parallel-to-serial converter 32 for converting the parallelly received data into serial data and for transferring the serial data into the terminal device connected to the node device concerned; an empty detector 34 for detecting the fact that the second receiving buffer 31 has become empty so as to transfer data from the first receiving buffer 30 into the second receiving buffer 31 upon detection of the second receiving buffer 31 being empty; and another empty detector 35 for detecting the fact that the parallel/serial converter 32 has completed the parallel/serial conversion and has become empty and for transferring data from the second receiving buffer 31 into the parallel/serial converter 32 upon detection of the parallel/serial converter 32 being empty.

A data processor 33 is arranged to control the operation of the aforementioned various devices of the data transmitting unit. For example, the data processor 33 initializes the counters 15 and 16, and sets numerical values in the registers 18-20.

In the aforementioned arrangement, the communication frame on the loop transmission line 1 is received by the frame receiving circuit 12. The received communication frame is transferred to the main- and sub-synchronizing pattern detectors 13 and 14 and the receiving gate 25 on one hand, and sent out onto the loop transmission line 1 again on the other hand. Upon detection of the main-synchronizing pattern S0 by the main-synchronizing pattern detector 13 or upon detection of the sub-synchronizing pattern S1-S7 by the sub-synchronizing pattern detector 14, the counters 15 and 16 are incremented or cleared, and the transmitting gate 24 and the receiving gate 25 are opened in response to a specific one of the time slots in a specific frame allotted to the node device concerned, so that the transmitting data from the terminal device connected to the node device concerned are inserted into the communication frame and that the receiving data are taken into the receiving buffer.

That is, the transmitting data from the terminal device is transferred from the serial/parallel converter 28 to the transmitting buffer 27 when the data has been stored by six bits in the serial/parallel converter 28, and at the same time a validity bit is set in a validity indicating bit appending circuit 26. Then, the transmitting data are transmitted by the frame transmitting circuit 11 onto the loop transmission line 1 when the transmitting gate is opened. After the data has been transmitted, the validity indicating bit is cleared and the validity indicating bit appending circuit 26 is kept standing-by until the next six bits of data have been stored.

When the receiving gate 25 is opened, the received data is taken into the receiving buffer 30 if the data is provided with a validity indicating bit. The received data is then transferred to the parallel/serial converter 32 through the receiving buffer 31 and converted into a serial signal which is in turn transferred to the terminal device of the node device concerned.

FIG. 5 shows, by way of example, the relation among the numerical value $N_1$ set in the frame mode register 18, the numerical value $N_2$ set in the frame number register 19, a number $F_n$ of the sub-frame which can be used by the node device concerned, and the data transmitting capacity Y (data transmitting/receiving speed of the terminal device which can be connected to the node device concerned).

In the case $N_1 = 1$, the frame mode is a 1/1 (=8/8) mode in which the data transmission/reception is performed for every sub-frame so that it is possible to obtain a data transmitting capacity of 48K bps by using one time slot per sub-frame. In this case, the numerical value of $N_2$ may be any one of 0 to 7. If the numerical value $N_1$ is set to "2", "4", or "8", the 1/$N_1$ of the eight sub-frames which are determined in accordance with the numerical value of $N_2$ are allotted to the node device concerned. For example, in the case of the ¼ mode, the allotment of the sub-frames is grouped into four combinations of (the 0-th and the 4th sub-frames), (the 1st and the 5th sub-frames), (the 2nd and the 6th sub-frames), and (the 3rd and the 7th sub-frames). Thus, it is possible to provide four 12K bps channels in a time slot of the same number by changing the sub-frame to be used. Accordingly, it is possible to transmit data at the same time from four pairs of terminal devices each of which has a data transmitting capacity not larger than 12K bps, for example, equal to 9.6K bps, by using the same time slot. Similarly to this, for example, because it is sufficient to set a ⅛ mode for the node device to which a low speed terminal device of 4.8K bps, it is possible to transmit/receive data to/from eight pairs of terminal device at the same time by using the same time slot.

As discussed above, according to the present invention, in a communication system in which high-speed and low-speed circuits are formed by mixture on a data transmission line in a time-division multiplexing manner, a plurality of frames (sub-frames) are circulated on the transmission line and a frame or frames which can be used by a low speed terminal device are specified to thereby enable the same time slot to be commonly used by a plurality of low speed terminal devices. Thus, it is made possible to form a plurality of low speed circuits by using one time slot so that various types of and numbers of terminal devices can be connected onto one network.

We claim:

1. A communication system in which a plurality of terminal devices connected respectively through node devices to a loop transmission line perform data transmission/reception in a time-division multiplexing manner by using a communication frame constituted by a plurality of sub-frames circulating on said transmission line, each of said sub-frames being constituted by a plurality of time slots, each of said node devices comprising:

first means for storing a first parameter for specifying at least one of said plurality of sub-frames allotted to the respective node device;

second means for storing a second parameter for specifying at least one of said plurality of time slots of said at least one of said plurality of sub-frames allotted to said respective node device;

third means for receiving said communication frame from said loop transmission line;

fourth means for identifying said at least one of said time slots specified by said second parameter in said at least one of said sub-frames specified by said first parameter in said communication frame received by said third means;

fifth means for inserting data received from a corresponding terminal device and an indicator into said time slot identified by said fourth means in said communication frame and for sending said communication frame onto said loop transmission line, said indicator indicating validity of said data inserted in said time slot identified by said fourth means; and sixth means for extracting data from said time slot identified by said fourth means from said communication frame received by said third means and for transferring the extracted data to said corresponding terminal device when said indicator inserted in said time slot identified by said fourth means indicates said data in said time slot identified by fourth means to be valid.

2. A communication system according to claim 1, wherein said fourth means comprises:

first counter means for counting the number of sub-frames received by said third means, said first counter means being arranged to be preset to a first initial value every time said third means receives a head portion of said communication frame;

second counter means for counting the number of time-slots received by said third means, said second counter means being arranged to be reset to a second initial value every time said third means receives a head portion of each sub-frame; and means for producing a time-slot identification signal when a count value of said first counter means has a first predetermined relationship with said first parameter stored in said first means and a count value of said second counter means has a second predetermined relationship with said second parameter stored in said second means.

* * * * *